Patented July 19, 1932

1,867,982

UNITED STATES PATENT OFFICE

WILLIAM JOHNSON SMITH NAUNTON AND JOSEPH BARON PAYMAN, OF BLACKLEY, MANCHESTER, ENGLAND, ASSIGNORS TO IMPERIAL CHEMICAL INDUSTRIES LIMITED, OF LONDON, ENGLAND

MORPHOLINE DERIVATIVES OF THIURAM TETRASULPHIDE AND THE PROCESS OF MAKING THE SAME

No Drawing. Application filed July 6, 1928, Serial No. 290,878, and in Great Britain August 31, 1927.

This invention relates to new chemical compounds which are valuable vulcanization accelerators for rubber.

One of the problems of the rubber industry is the discovery of "safe" super-accelerators, that is to say, those which, whilst being as active as such super-accelerators as the tetraalkyl-thiuram disulphides, do not exhibit the tendency of these to induce "scorching" during the preliminary working up of the rubber compound or mix.

We have now discovered that when morpholine

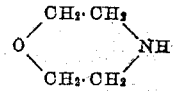

(Knorr, Berichte, 1889, 22, 2081) is treated with carbon disulphide in the usual manner for the preparation of dithiocarbamates, it is converted into a compound which on oxidation yields the corresponding thiuram disulphide

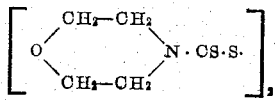

Thiuram monosulphide and polysulphides of analogous constitution may be obtained by appropriate methods.

The new products, as also the dithiocarbamates obtainable from the intermediate dithiocarbamic acid, possess the desirable property of accelerating the vulcanization of rubber without the tendency to induce "scorching".

This is indicated in the following experimental comparison of the new thiuram disulphide (which crystallizes from alcohol in pearly leaflets of M. P. 137–138° C.) with tetraethylthiuram disulphide.

Mixes were made containing:

| | Parts |
|---|---|
| Rubber | 100 |
| Zinc oxide | 10 |
| Barytes | 40 |
| Sulphur | 2 |
| Pigment | 0.5 |
| Accelerator | 0.375 |

The same pigment was used in both cases. The accelerator used is in one case the new thiuram disulphide and in the other case the tetraethylthiuram disulphide. The sheets were cured for 10 minutes at a steam pressure of 40 lbs. per square inch, and their breaking tension ($T_B$) and percentage elongation at breaking tension ($E_B$) were determined.

The results were:

| | $T_B$ | $E_B$ |
|---|---|---|
| | Kilos per sq. cm. | Per cent |
| 1. Using tetraethylthiuram disulphide | 200 | 830 |
| 2. Using morpholinethiuram disulphide | 208 | 900 | showing that the new compound is rather better as an accelerator than tetraethylthiuram disulphide. In order to test their relative "scorching power", sheets of the above mixes were wrapped on tubular metal formers and kept in boiling water for 90 minutes. The mix containing tetraethylthiuram disulphide was completely cured, whereas that containing the morpholinethiuram disulphide was found to be practically uncured.

Similar results, that is like compounds containing morphyl residues, are obtained when using homologues and derivatives of morpholine in place of morpholine itself, provided, of course, that the NH group of the morpholine ring is unsubstituted.

Homologues and derivatives of morpholine as well as morpholine itself may be prepared in the manner described in the copending application Ser. No. 296,863 filed by one of the present applicants, Joseph Baron Payman, and another. This process for preparing morpholine compounds comprises condensing a beta-hydroxy-alpha-halogenated derivative of ethane or a homologue of the same, that is a compound of the general type

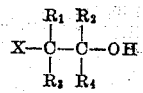

wherein $R_1$, $R_2$, $R_3$ and $R_4$ represent hydrogen or substituent groups other than halogen and X represents a halogen, with an aromatic sulphonamide having the general formula $$R-SO_2-NH_2$$

wherein R represents an aryl residue free from unsubstituted amino groups. This condensation produces an N-di-substituted arylsulphonamide of the characteristic structure

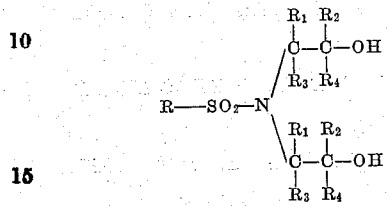

This N-di-substituted arylsulphonamide is then isolated and treated with a condensing agent, for instance concentrated sulphuric acid, at a temperature above 100° C. to effect a ring closure and thereby produce a morpholyl arylsulphonamide which is an intermediate product in the process and may be separated as such. To produce the morpholine compound, this morpholyl arylsulphonamide is hydrolyzed and the morpholine compound which is split off is then isolated. As stated above the intermediate morpholyl arylsulphonamide may be isolated and then hydrolyzed to produce the morpholine compound. It is also within the scope of our invention to carry out the process without isolating the intermediate product and produce directly the morpholine compound. That this intermediate product can be isolated as such, shows that in the present process the ring closure occurs before scission.

The reactions taking place in the present process, for example, when ethylene chlorohydrin is used, are probably as follows:

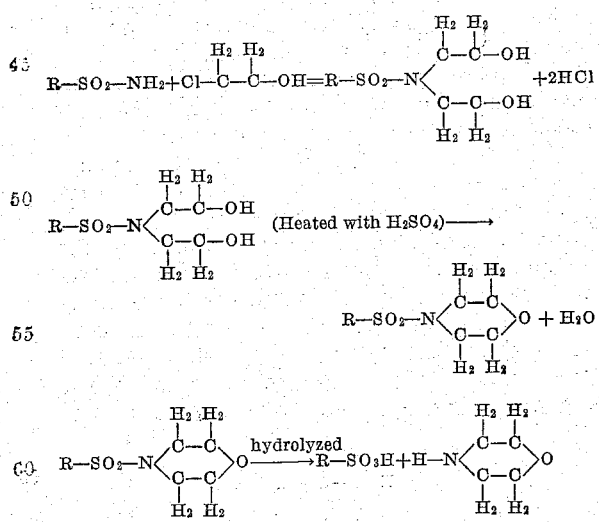

By the above process it is not only possible to prepare morpholine itself but also many new morpholine compounds having substituent atoms or groups attached to the carbon atoms of the morpholine ring.

These morpholine compounds are the homologues and derivatives of morpholine which are mentioned above and may be used as starting materials in producing the morphyl-dithio-carbamates and morphylthiuram sulphides in our present processes.

Our invention is illustrated but not limited by the following examples, in which the parts are by weight.

*Example 1.—Preparation of morpholine salt of morphyldithiocarbamate*

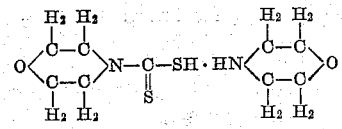

A solution of 87 parts of morpholine in 90–100 parts of water is cooled with rapid agitation and 38 parts of carbon disulphide are added slowly. The dithiocarbamate separates as a white product and is filtered off. A further quantity is obtained by adding carbon disulphide to the filtrate. The yield is almost quantitative. After crystallization from water the product melts at 187° C. with decomposition.

*Example 2.—Preparation of zinc morphyldithiocarbamate*

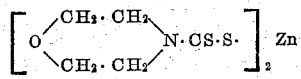

A solution containing 87 parts of morpholine (1 molecule), 76 parts of carbon disulphide, 120 parts of 33% caustic soda solution, and 400 to 2000 parts of water is treated with a solution of zinc chloride or other soluble zinc salt in slightly over theoretical quantity. The zinc morphyldithiocarbamate is instantly precipitated as a white product in almost theoretical yield and high purity. In practice it is found that the higher dilution is the more convenient and gives satisfactory results.

Other metal salts may be similarly prepared.

*Example 3.—Preparation of dimorphylthiuram disulphide*

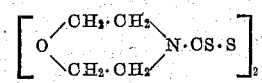

A mixture of 87 parts of morpholine, 120 parts of 33% caustic soda liquor and 400 parts of water is cooled and well agitated. To this is run in slowly 80 parts (1 molecule and excess) of carbon disulphide. Stirring is continued for a few hours and any separated sodium salt is dissolved by the addition of a further quantity of water. The solution is then oxidized by any of the usual oxidizing agents until no further precipitation occurs. The disulphide is thrown down as a creamy white powder in substantially theoretical yield.

It is soluble in alcohol and chloroform and extremely soluble in benzene. After recrystallization it has melting point 146–147° C.

*Example 4.—Preparation of dimorphyl-thiuram monosulphide*

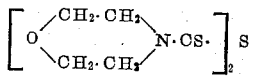

40.5 parts of the disulphide obtained according to Example 3 are suspended in 100 parts of alcohol at 60° C., 7 parts of sodium cyanide dissolved in 25 parts of water are added, and the mixture is shaken vigorously. Within a few minutes dissolution is complete with production of a deep yellow solution. This is followed presently by separation of crystalline monosulphide. The mixture is cooled and filtered, the crystalline product being washed with water. Dimorphylthiuram monosulphide crystallizes in prismatic needles, melting, after recrystallization, at 125–126° C.

*Example 5.—Preparation of dimorphyl-thiuram "tetrasulphide"*

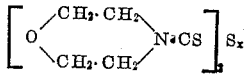

A solution of the sodium salt of the dithiocarbamate of morpholine made by adding 80 parts of carbon disulphide to a cooled, well-stirred mixture of 87 parts of morpholine, 120 parts of 33% caustic soda liquor, and 400 parts of water is cooled and well agitated. To this are added slowly 67 parts of sulphur monochloride ($S_2Cl_2$). The so-called "tetrasulphide" is thrown down as a white precipitate. This product has an indefinite melting point and is probably a mixture of polysulphides.

What we claim and desire to secure by Letters Patent is:—

1. In the manufacture of morpholine derivatives of thiuram tetrasulphide, the process which comprises reacting a morpholine compound with caustic soda solution to form the sodium salt of a morphyl-dithiocarbamate, reacting the solution of the said sodium salt thus obtained with sulphur monochlorid to form the corresponding thiuram tetrasulphide, the said thiuram tetrasulphide having the probable formula

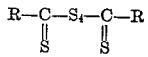

wherein R represents the morphyl group.

2. As a new product, morpholine derivatives of thiuram tetrasulphide.

3. In the manufacture of dimorphyl thiuram tetrasulphide, the process which comprises reacting morpholine with carbon-disulphide in caustic alkali solution to form an alkali metal salt of morphyl dithiocarbamate, reacting the said alkali metal salt thus obtained with sulphur monochloride, and isolating the dimorphyl thiuram tetrasulphide thus produced.

In testimony whereof we affix our signatures.

WILLIAM JOHNSON SMITH NAUNTON.
JOSEPH BARON PAYMAN.